United States Patent
Hsia

(10) Patent No.: US 10,139,093 B2
(45) Date of Patent: Nov. 27, 2018

(54) LINEAR SOLID-STATE LIGHTING WITH A PULSE AMPLITUDE CONTROL SCHEME

(71) Applicant: Aleddra Inc., Renton, WA (US)

(72) Inventor: Chungho Hsia, Bellevue, WA (US)

(73) Assignee: ALEDDRA INC., Renton, WA (US)

( * ) Notice: Subject to any disclaimer, the term of this patent is extended or adjusted under 35 U.S.C. 154(b) by 0 days.

(21) Appl. No.: 15/959,066

(22) Filed: Apr. 20, 2018

(65) Prior Publication Data

US 2018/0238531 A1  Aug. 23, 2018

Related U.S. Application Data

(63) Continuation-in-part of application No. 15/836,170, filed on Dec. 8, 2017, now Pat. No. 10,021,753, which is a continuation-in-part of application No. 15/649,392, filed on Jul. 13, 2017, now Pat. No. 9,986,619, which is a continuation-in-part of application No. 15/444,536, filed on Feb. 28, 2017, now Pat. No. 9,826,595, which is a
(Continued)

(51) Int. Cl.
| | |
|---|---|
| *F21V 25/04* | (2006.01) |
| *H05B 33/08* | (2006.01) |
| *F21K 9/272* | (2016.01) |
| *H02M 1/32* | (2007.01) |
| *H02M 7/217* | (2006.01) |
| *F21Y 115/10* | (2016.01) |
| *F21Y 103/10* | (2016.01) |

(52) U.S. Cl.
CPC ............ *F21V 25/04* (2013.01); *F21K 9/272* (2016.08); *H02M 1/32* (2013.01); *H02M 7/217* (2013.01); *H05B 33/0815* (2013.01); *H05B 33/0884* (2013.01); *F21Y 2103/10* (2016.08); *F21Y 2115/10* (2016.08)

(58) Field of Classification Search
None
See application file for complete search history.

(56) References Cited

U.S. PATENT DOCUMENTS 4,398,080 A * 8/1983 Johansson ............ B23K 9/091
219/130.1
5,612,594 A * 3/1997 Maheshwari ........ H05B 41/295
315/209 R
(Continued)

*Primary Examiner* — Minh D A
*Assistant Examiner* — James H Cho
(74) *Attorney, Agent, or Firm* — Han IP PLLC; Andy M. Han

(57) ABSTRACT

A linear light-emitting diode (LED)-based tube (LLT) lamp comprises a pulse amplitude control module, a power sustaining device, an LED driving circuit, and LED arrays. The pulse amplitude control module is configured to generate one or more voltage pulses in each alternate-current (AC) cycle in response to a half-wave direct-current (DC) voltage when the LLT lamp starts to receive power from an input AC line voltage and when the half-wave DC voltage drops to a few tens of volts in each AC cycle. The power sustaining device receives the one or more voltage pulses and builds up a DC voltage depending on pulse amplitudes. When an electric shock occurs, the DC voltage built up is not high enough to operate the LED driving circuit and thus to disable the LED arrays, without electric shock current leaking into an electrical conductor of the LLT lamp during relamping or maintenance.

18 Claims, 7 Drawing Sheets

Related U.S. Application Data continuation-in-part of application No. 15/362,772, filed on Nov. 28, 2016, now Pat. No. 9,967,927, which is a continuation-in-part of application No. 15/225,748, filed on Aug. 1, 2016, now Pat. No. 9,743,484, which is a continuation-in-part of application No. 14/818,041, filed on Aug. 4, 2015, now Pat. No. 9,420,663, which is a continuation-in-part of application No. 14/688,841, filed on Apr. 16, 2015, now Pat. No. 9,288,867, which is a continuation-in-part of application No. 14/465,174, filed on Aug. 21, 2014, now Pat. No. 9,277,603, which is a continuation-in-part of application No. 14/135,116, filed on Dec. 19, 2013, now Pat. No. 9,163,818, which is a continuation-in-part of application No. 13/525,249, filed on Jun. 15, 2012, now Pat. No. 8,749,167.

(56) References Cited

U.S. PATENT DOCUMENTS

| | | | |
|---|---|---|---|
| 5,771,164 A * | 6/1998 | Murai | H02M 1/4208 323/222 |
| 2012/0119666 A1* | 5/2012 | Adamowicz | H05B 41/2928 315/224 |

* cited by examiner

LINEAR SOLID-STATE LIGHTING WITH A PULSE AMPLITUDE CONTROL SCHEME

CROSS-REFERENCE TO RELATED APPLICATIONS

The present disclosure is part of a continuation-in-part (CIP) application of U.S. patent application Ser. No. 15/836,170, filed 8 Dec. 2017, which is a CIP application of U.S. patent application of Ser. No. 15/649,392 filed 13 Jul. 2017, which is a CIP application of U.S. patent application Ser. No. 15/444,536, filed 28 Feb. 2017 and issued as U.S. Pat. No. 9,826,595 on 21 Nov. 2017, which is a CIP application of U.S. patent application Ser. No. 15/362,772, filed 28 Nov. 2016, which is a CIP application of U.S. patent application Ser. No. 15/225,748, filed 1 Aug. 2016 and issued as U.S. Pat. No. 9,743,484 on 22 Aug. 2017, which is a CIP application of U.S. patent application Ser. No. 14/818,041, filed 4 Aug. 2015 and issued as U.S. Pat. No. 9,420,663 on 16 Aug. 2016, which is a CIP application of U.S. patent application Ser. No. 14/688,841, filed 16 Apr. 2015 and issued as U.S. Pat. No. 9,288,867 on 15 Mar. 2016, which is a CIP application of U.S. patent application Ser. No. 14/465,174, filed 21 Aug. 2014 and issued as U.S. Pat. No. 9,277,603 on 1 Mar. 2016, which is a CIP application of U.S. patent application Ser. No. 14/135,116, filed 19 Dec. 2013 and issued as U.S. Pat. No. 9,163,818 on 20 Oct. 2015, which is a CIP application of U.S. patent application Ser. No. 13/525,249, filed 15 Jun. 2012 and issued as U.S. Pat. No. 8,749,167 on 10 Jun. 2014. Contents of the above-identified applications are incorporated herein by reference in their entirety.

BACKGROUND

Technical Field

The present disclosure relates to linear light-emitting diode (LED) lamps and more particularly to a linear LED lamp with a pulse amplitude control scheme configured to prevent electric shock current from reaching ground through a person's body during relamping or maintenance.

Description of the Related Art

Solid-state lighting from semiconductor LEDs has received much attention in general lighting applications today. Because of its potential for more energy savings, better environmental protection (no hazardous materials used), higher efficiency, smaller size, and much longer lifetime than conventional incandescent bulbs and fluorescent tubes, the LED-based solid-state lighting will be a mainstream for general lighting in the near future. As LED technologies develop with the drive for energy efficiency and clean technologies worldwide, more families and organizations will adopt LED lighting for their illumination applications. In this trend, the potential safety concerns such as risk of electric shock and fire become especially important and need to be well addressed.

In today's retrofit application of a linear LED tube (LLT) lamp to replace an existing fluorescent tube, consumers may choose either to adopt a ballast-compatible LLT lamp with an existing ballast used to operate the fluorescent tube or to employ an AC mains-operable LED lamp by removing/bypassing the ballast. Either application has its advantages and disadvantages. In the former case, although the ballast consumes extra power, it is straightforward to replace the fluorescent tube without rewiring, which consumers may have a first impression that it is the best alternative to fluorescent tube lamps. But the fact is that total cost of ownership for this approach is high regardless of very low initial cost. For example, the ballast-compatible LLT lamps work only with particular types of ballasts. If the existing ballast is not compatible with the ballast-compatible LLT lamp, the consumers will have to replace the ballast. Some facilities built long time ago incorporate different types of fixtures, which requires extensive labor for both identifying ballasts and replacing incompatible ones. Moreover, a ballast-compatible LLT lamp can operate longer than the ballast. When an old ballast fails, a new ballast will be needed to replace in order to keep the ballast-compatible LLT lamps working. Maintenance will be complicated, sometimes for lamps and sometimes for ballasts. The incurred cost will preponderate over the initial cost savings by changeover to the ballast-compatible LLT lamps for hundreds of fixtures throughout a facility. When the ballast in a fixture dies, all the ballast-compatible tube lamps in the fixture go out until the ballast is replaced. In addition, replacing a failed ballast requires a certified electrician. The labor costs and long-term maintenance costs will be unacceptable to end users. From energy saving point of view, a ballast constantly draws power, even when the ballast-compatible LLT lamps are dead or not installed. In this sense, any energy saved while using the ballast-compatible LLT lamps becomes meaningless with the constant energy use by the ballast. In the long run, ballast-compatible LLT lamps are more expensive and less efficient than self-sustaining AC mains-operable LLT lamps.

On the contrary, an AC mains-operable LLT lamp does not require a ballast to operate. Before use of an AC mains-operable LLT lamp, the ballast in a fixture must be removed or bypassed. Removing or bypassing the ballast does not require an electrician and can be replaced by end users. Each AC mains-operable LLT lamp is self-sustaining. If one AC mains-operable tube lamp in a fixture goes out, other lamps in the fixture are not affected. Once installed, the AC mains-operable LLT lamps will only need to be replaced after 50,000 hours. In view of above advantages and disadvantages of both ballast-compatible LLT lamps and AC mains-operable LLT lamps, it seems that market needs a most cost-effective solution by using a universal LLT lamp that can be used with the AC mains and is compatible with a ballast so that LLT lamp users can save an initial cost by changeover to such a universal LLT lamp followed by retrofitting the lamp fixture to be used with the AC mains when the ballast dies.

In the U.S. patent application Ser. No. 14/688,841, filed Apr. 16, 2015, two shock prevention switches and an all-in-one driving circuit are adopted in an LLT lamp such that AC power from either a ballast or the AC mains can operate the LLT lamp without operational uncertainty and electric shock hazards. In other words, no matter what a lamp fixture is configured as the AC mains- or a ballast-compatible fashion, the LLT lamp automatically detects configurations and works for either one. All of such LLT lamps, no matter whether AC mains-operable or ballast-compatible, are electrically wired as double-ended and have one construction issue related to product safety and needed to be resolved prior to wide field deployment. This kind of LLT lamps, if no shock prevention scheme is adopted in, always fails a safety test, which measures a through-lamp electric shock current. Because an AC-mains voltage applies to both opposite ends of the LLT lamps, the measurement of current leakage from one end to the other consistently results in a substantial current flow, which may present a risk of an electric shock during re-lamping. Due to this potential shock risk to the person who replaces the LLT lamps in an existing fluorescent tube fixture, Underwriters Laboratories (UL) uses its safety standard, UL 935, Risk of Shock During Relamping (Through Lamp), to do a current leakage test and to determine if the LLT lamps meet the consumer safety requirement. Although the LLT lamps used with a ballast can pass the current leakage test, some kinds of electric shock hazards do exist. Experimental results show that the skin of the person who touches an exposed bi-pin may be burned due to such an electric shock. Fortunately, a mechanism of double shock prevention switches used in applications with the AC mains is also effective in applications with the ballasts to prevent the electric shock from occurring, thus protecting consumers from such a hazard, no matter whether input voltage is from the AC mains or the ballast. Therefore, a universal LLT lamp that can work with either the AC mains or the ballast makes sense. The effectiveness of using double shock prevention switches for applications in the AC mains has been well addressed in U.S. Pat. No. 8,147,091, issued on Apr. 3, 2012. However, a conventional shock prevention switch has an inherent issue related to an electric arc when operated with a ballast. Unlike an AC voltage of 120 or 277 V/50-60 Hz from the AC mains, the output AC voltage and current from the ballast presents a negative resistance characteristic. The feature that originally supports a fluorescent tube to function properly becomes extremely detrimental to the conventional shock prevention switch due to the electric arc likely occurring between two electrical contacts that have a high electrical potential difference with a high frequency, such as 600 V/50 kHz. Once a consumer fails to follow installation instructions to install or uninstall linear LED tube lamps such that one of two ends of the tube lamp is in the fixture socket connected to a powered ballast, and the other end is tweaked to connect to or disconnect from the associated socket, an internal electric arcing may occur between the electrical contacts in the associated switch. The arcing even in a short period such as several seconds can generate high heat, burning and melting electrical contacts and neighboring plastic enclosures, creating a fire hazard. The AC voltage of 120 or 277 V/50-60 Hz from the AC mains does not have such an issue because its voltage is relatively low compared with the ballast output voltage of 600 V. Moreover, the AC frequency of 60 Hz automatically extinguishes an electric arc every 1/60 seconds, if existed. That is why a utility switch can be used in an electrical appliance to turn power on and off without any problem. However when used with the ballast, the electrical contacts used in the conventional shock prevention switch can easily be burned out due to the high-voltage and high-frequency arcing introduced between each gap of each pair of the electrical contacts in the conventional shock prevention switch when someone tries to abusively tweak to remove the tube lamp from the fixture with the ballast that has a power on it. Although such a situation is rare, an internal arcing, if occurred, does cause burning and even welding of the electrical contacts and melting of the plastic enclosure, so called internal fire, creating consumer safety issues.

Today, such LLT lamps are mostly used in a ceiling light fixture with a wall-mount power switch. The ceiling light fixture could be an existing one used with fluorescent tubes but retrofitted for LLT lamps or a specific LLT lamp fixture. The drivers that provide a proper voltage and current to LED arrays could be internal or external ones. Not like LLT lamps with an external driver that is inherently electric-shock free if the driver can pass a dielectric withstand test used in the industry, LLT lamps with an internal driver could have a shock hazard during relamping or maintenance, when the substantial through-lamp electric shock current flows from any one of AC voltage inputs through the internal driver connecting to LED arrays to the earth ground. Despite this disadvantage, LLT lamps with the internal driver still receive wide acceptance because they provide a stand-alone functionality and an easy retrofit for an LLT lamp fixture. As consumerism develops, consumer product safety becomes extremely important. Any products with electric shock or fire hazards and risk of injuries or deaths are absolutely not acceptable for consumers. However, commercially available LLT lamps with internal drivers, single-ended or double-ended, fail to provide effective solutions to the problems of possible electric shock and internal arcing and fire.

In the prior art mentioned above, the double shock protection switches with mechanical actuation mechanisms protruding outwards from both ends of the LLT lamp are proposed to control a line voltage from the AC mains or high voltages from the ballasts to connect to the LLT lamp. However, a length control of the LLT lamp becomes critical to operate the LLT lamp because sometimes the double shock protection switches may not be actuated by the mechanical actuation mechanisms. Also, the double shock protection switches directly control AC voltages such as 120 or 277 V/50-60 Hz from the AC mains or 600 V/45-65 kHz from the ballasts, which makes the conventional LLT lamp so vulnerable because such high voltages working on the double shock protection switches may easily cause internal fire if consumers abusively tweak the mechanical actuation mechanisms at both ends of the LLT lamp operable with a ballast during relamping. It is, therefore, the purpose of the present disclosure to disclose a novel pulse amplitude control scheme to be used in the LLT lamp to eliminate above-mentioned electric shock and internal fire hazards and to work more reliably to protect consumers.

SUMMARY

An LLT lamp comprising a housing, two lamp bases at two ends of the housing, a direct-current (DC) voltage module, an LED driving circuit, one or more LED arrays, a pulse amplitude control module, and at least one electrical conductor protruding outwards from each lamp base, is used to replace a fluorescent tube or a conventional LED tube lamp. The DC voltage module comprises at least one full-wave rectifier connected to an input alternate-current (AC) line voltage via the at least one electrical conductor in each lamp base. The DC voltage module configured to convert the input AC line voltage not only to a full-wave DC voltage but also to a half-wave DC voltage. The LED driving circuit comprises a power factor correction (PFC) and control device, a power sustaining device, a Buck converter comprising a transformer comprising a primary winding and an auxiliary winding, a flyback diode, an output resistor, and an output capacitor in parallel with output resistor. The LED driving circuit is configured to receive the full-wave DC voltage, to generate an LED voltage and current, and to power up the one or more LED arrays. The pulse amplitude control module is configured to generate one or more voltage pulses in each AC cycle in response to the half-wave DC voltage when the LLT lamp starts to receive power from the input AC line voltage and when the half-wave DC voltage drops to a few tens of volts in each AC cycle. The power sustaining device is configured to receive the one or more voltage pulses in each AC cycle, to build up a DC voltage, and to operate the PFC and control device.

When an electric shock occurs, the pulse amplitude control module generates the one or more voltage pulses with a relatively low amplitude such that a first DC voltage on the power sustaining device fails to reach an operating voltage of the PFC and control device, thereby disabling the PFC and control device and the LED driving circuit without electric shock current leaking into the at least one electrical conductor. When the at least one electrical conductor in each lamp base is inserted into the respective lamp fixture socket and receives the input AC line voltage without an electric shock hazard, the pulse amplitude control module generates the one or more voltage pulses with a relatively high amplitude such that a second DC voltage on the power sustaining device reaches the operating voltage of the PFC and control device, thereby enabling the LED driving circuit so as to deliver electrical power to the one or more LED arrays.

The pulse amplitude module further comprises a resistive load configured to provide a current return path coupled to a common ground of the full-wave rectifier to generate the half-wave DC voltage and to operate the pulse amplitude control module. The pulse amplitude control module further comprises a first control mechanism, a second control mechanism, and a third control mechanism. The first control mechanism is coupled to the auxiliary winding. When the electric shock does not occur and when the LED driving circuit is operated, the first control mechanism operates to disable both the second control mechanism and the third control mechanism.

The second control mechanism is coupled to the at least one electrical conductor in a lamp base and configured to set up a reference voltage, to compare the half-wave DC voltage with the reference voltage, and to create initial one or more pulses in each AC cycle in response to the half-wave DC voltage, which is affected when a person touches an exposed electrical conductor of the LLT lamp, regarded as the electric shock. The third control mechanism is connected to the at least one electrical conductor in a lamp base and configured to create the one or more voltage pulses in response to the initial one or more pulses in each AC cycle and to build up the first DC voltage or the second DC voltage in the power sustaining device, depending on whether the electric shock occurs or not. As mentioned above, when the electric shock occurs, the first DC voltage is built up in the power sustaining device but not high enough to operate the PFC and control device. On the contrary, when the electric shock does not occur, the second DC voltage is built up in the power sustaining device, which is high enough to operate the PFC and control device.

The pulse amplitude control module further comprises a first diode and a second diode connected to the first diode with a cathode joint. The anode of the second diode is coupled to the auxiliary winding, whereas the anode of the first diode is connected to the third control mechanism. The power sustaining device is coupled to the cathode joint to receive the first DC voltage or the second DC voltage from the third control mechanism or a third DC voltage from the auxiliary winding of the LED driving circuit, depending on whether the electric shock occurs or not. As mentioned above, when the electric shock occurs, the power sustaining device builds up the first DC voltage, which is not high enough to operate the PFC and control device with the LED driving circuit disabled. As long as the electric shock continues to exist, the third control mechanism continues to send the one or more voltage pulses in each AC cycle to build up the first DC voltage in the power sustaining device, thereby continuing to disable the LED driving circuit. However, if the electric shock does not occur, the power sustaining device builds up the second DC voltage, which is high enough to operate the PFC and control device with the LED driving circuit enabled. That is to say, when the input AC line voltage is applied without the electric shock, both the second control mechanism and the third control mechanism are immediately enabled while the PFC and control device has not received power from the power sustaining device, and the LED driving circuit is disabled. In this case, the first diode is forward-biased while the second diode is reverse-biased, and a first electric current is conducted to flow from the third control mechanism into the power sustaining device via the first diode. When the electric shock occurs, both the second control mechanism and the third control mechanism are continuously enabled with the first DC voltage in the power sustaining device while the LED driving circuit is continuously disabled, no substantial electric shock current actually leaking into the at least one electrical conductor. When an electric shock hazard disappears, the pulse amplitude control module builds up the second DC voltage in the power sustaining device to enable the LED driving circuit. Once the LED driving circuit is operated, the first control mechanism is enabled to disable both the second control mechanism and the third control mechanism. In this case, the second diode is forward-biased with a second electric current flowing from the auxiliary winding into the power sustaining device to build up the third DC voltage via the second diode. The third DC voltage is high enough to continuously operate the PFC and control device, thereby continuously operating the LED driving circuit. The LED driving circuit further comprises a voltage feedback module connected between the auxiliary winding and the second diode and between the auxiliary winding and the first control mechanism. The voltage feedback module is configured to power the power sustaining device and to operate the first control mechanism when the electric shock does not exist.

BRIEF DESCRIPTION OF THE DRAWINGS

Non-limiting and non-exhaustive embodiments of the present disclosure are described with reference to the following figures, wherein like reference numerals refer to like parts throughout the various figures unless otherwise specified.

DETAILED DESCRIPTION OF THE INVENTION

Figure 1:
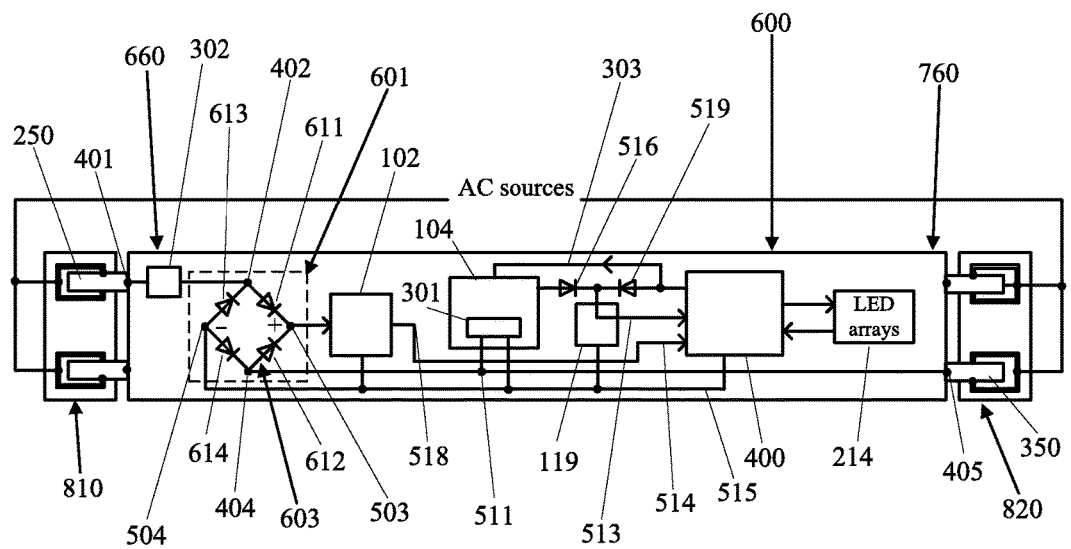
FIG. 1 is one embodiment of an LLT lamp installed in lamp fixture sockets connected with AC sources according to the present disclosure.

FIG. 1 is one embodiment of an LLT lamp installed in lamp fixture sockets connected with AC sources according to the present disclosure. The LLT lamp 600 comprises a housing having two ends; two lamp bases 660 and 760 each having at least one electrical conductor 250 and 350 at each end of the housing, a first input filter 302, a DC voltage module 601, a pulse amplitude control module 104, an LED driving circuit 110 (in FIG. 3), and one or more LED arrays 214. The DC voltage module 601 comprises a full-wave rectifier 603 comprising diodes 611, 612, 613, and 614 interconnected at ports 402, 404, 503, and 504. The full-wave rectifier 603 is connected to an input AC line voltage via the at least one electrical conductor 250 and 350 in each lamp base, configured to convert the input AC line voltage not only to a full-wave DC voltage but also to a half-wave DC voltage. The LED driving circuit 110 (in FIG. 3) comprises a second input filter 102 connected to the port 503 of the full-wave rectifier 603, a driver 400 connected to the one or more LED arrays 214, and a power sustaining device 119 connected between the pulse amplitude control module 104 and the driver 400. The pulse amplitude control module 104 comprises an input 511 connected to the at least one electrical conductor 350 in a lamp base in a way that the half-wave DC voltage appears at the input. The power sustaining device 119 may comprise at least one capacitor. The pulse amplitude control module 104 further comprises a port 303 connected to the driver 400 to receive a signal from the driver 400 to disable the pulse amplitude control module 104 when the driver 400 is operated. The pulse amplitude control module 104 is configured to generate one or more voltage pulses when the half-wave DC voltage drops to a few tens of volts in each AC cycle and to control a DC voltage in the power sustaining device 119. The pulse amplitude module 104 further comprises a resistive load 301 configured to provide a current return path coupled to a common ground of the full-wave rectifier 603 to generate the half-wave DC voltage via the diode 613 and to operate the pulse amplitude control module 104. The driver 400 comprises a low voltage input 513, a high voltage input 514 connected to a port 518 of the second input filter 102, the port 303 coupled to the power sustaining device 119 and connected to the pulse amplitude control module 104, and a common port 515 connected to the port 504 of the full-wave rectifier 603. The power sustaining device 119 receives the one or more voltage pulses from the pulse amplitude control module 104 via a first diode 516 to build up a first DC voltage or a second DC voltage in the power sustaining device 119, depending on whether the electric shock occurs or not. When the electric shock occurs, the first DC voltage is built up in the power sustaining device 119 but not high enough to operate the driver 400. On the contrary, when the electric shock does not occur, the second DC voltage is built up in the power sustaining device 119, which is high enough to operate the driver 400. When the driver 400 is operated, the power sustaining device 119 receives partial power from the driver 400 via a second diode 519 to build up a third DC voltage and to continue to operate the driver 400.

The driver 400 further comprises a Buck converter (in FIGS. 4-6) connected to the high voltage input 514 of the driver 400, whereas the low voltage input 513 is configured to provide the driver 400 with sustaining power to operate the Buck converter, further controlling a proper current and voltage to drive the one or more LED arrays 214. In FIG. 1, the full-wave rectifier 603 is always connected to the at least one electrical conductor 250 and the at least one electrical conductor 350 and receives AC power. The driver 400 is connected to the full-wave rectifier 603 via the second input filter 102, receiving the DC voltage V+ from the port 503 through the high voltage input 514. However, without receiving the second DC voltage or the third DC voltage from the low voltage input 513, the driver 400 cannot be operated to power the one or more LED arrays 214. Without electric current returned from the one or more LED arrays 214 to reach an exposed at least one electrical conductor 250 or 350, no electric shock will occur even though the at least one electrical conductor 250 and the at least one electrical conductor 350 are electrically connected with the full-wave rectifier 603, which energizes the driver 400.

When both the at least one electrical conductor 250 and the at least one electrical conductor 350 in each lamp base are respectively inserted into the lamp fixture sockets 810 and 820, the pulse amplitude control module 104 starts to provide the one or more voltage pulses in each AC cycle. The electric current can flow from the power sustaining device 119, entering the low voltage input port 513 of the driver 400. During system start-up, the electric current from one port of the AC sources can flow from the electrical contact 401 of the at least one electrical conductor 250, the full-wave rectifier 603 through the diode 611 to the port 503, going through the second input filter 102. Whereas the driver 400 is already energized through a high voltage at the high voltage input port 514, the second DC voltage built up from the power sustaining device 119 starts to operate the driver 400, powering the one or more LED arrays 214. The current returns to the common port 515 of the driver 400, continuing to flow through the diode 614 of the full-wave rectifier 603, the electrical contact 405 of the at least one electrical conductor 350 to the other port of the AC sources, completing the positive half cycle power transfer. Once the driver 400 is operated, it extracts partial power from an output voltage to pour into the power sustaining device 119 to maintain its operation.

For a negative half cycle, the electric current from one port of the AC sources can flow from the electrical contact 405 of the at least one electrical conductor 350, the full-wave rectifier 603 through the diode 612 to the port 503. Similar to the current flow in the driver 400 for positive cycle, the electric current continues to flow through the diode 613 of the full-wave rectifier 603, the electrical contact 401 of the at least one electrical conductor 250 to the other port of the AC sources, completing the negative half cycle power transfer.

When the lamp base 660 is inserted in the lamp socket 810, which is connected to one port of the AC sources (say, the left side in FIG. 1), the LLT lamp 600 is energized. If the pulse amplitude control module 104 does not exist to control pulse amplitudes of the one or more voltage pulses in each AC cycle, the driver 400 will immediately be turned on and a substantial through-lamp electric shock current from the driver 400 and the one or more LED arrays 214 can always come out through the at least one electrical conductor 350, which may be exposed to a user for the electric shock. The electric shock may be fatal depending on impedance between the user's body and the earth ground. On the other hand, if the pulse amplitude control module exists and is connected to the power sustaining device 119, then the driver 400 is controlled by the DC voltage in the power sustaining device 119, and the through-lamp electric shock current from the driver 400 and the one or more LED arrays 214 can be set to zero. However, a small amount of the through-lamp electric current will come out from the second input filter 102 and some safety varistors and capacitors (not shown in FIG. 1) in front of the full-wave rectifier 603 and operating current of the pulse amplitude control module 104. Because such a load is a fraction of the load from the one or more LED arrays 214, the through-lamp electric current can be controlled to an acceptable level not exceeding a specific value defined in the safety standard UL 935, no fatal electric shock possible. In a normal operation when the at least one electrical conductor 250 and the at least one electrical conductor 350 are connected to the AC sources in a double-ended wiring lamp fixture, the driver 400 can receive power to drive the one or more LED arrays 214. As can be seen in FIG. 1, two sockets in each of the external fixture lamp sockets 810 and 820 are shunted, meaning that as long as the at least one electrical conductor 250 in the lamp base 660 and the at least one electrical conductor 350 in the lamp base 760 are connected to the AC sources, the LLT lamp adopting the approach depicted in FIG. 1 can operate with an acceptable through-lamp electric shock current, which is deemed safe for users.

Figure 2:
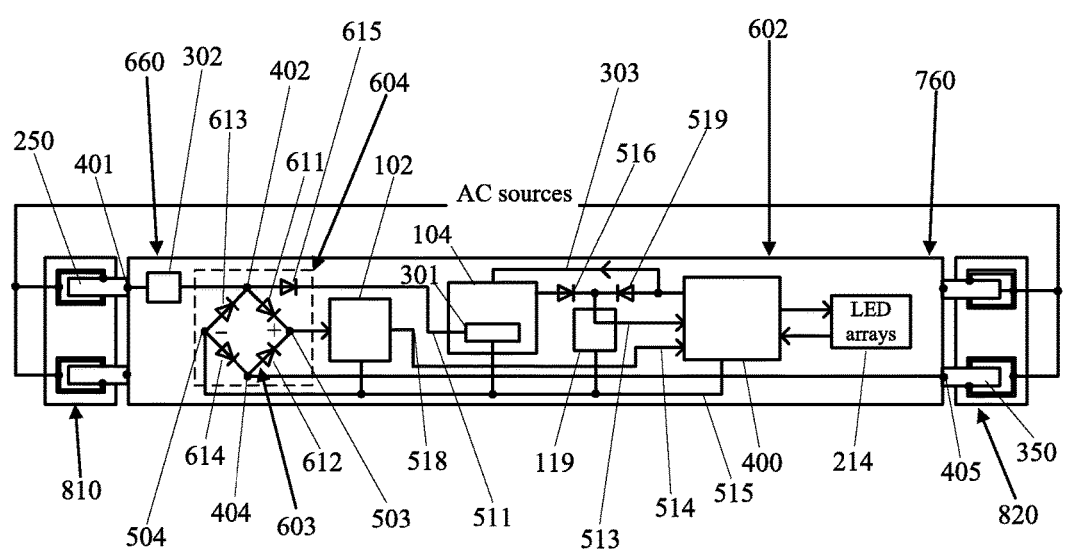
FIG. 2 is another embodiment of an LLT lamp installed in lamp fixture sockets connected with AC sources according to the present disclosure.

FIG. 2 is another embodiment of an LLT lamp installed in lamp fixture sockets connected with AC sources according to the present disclosure. The LLT lamp 602 in FIG. 2 has almost all the components as the LLT lamp 600 in FIG. 1, except that a DC voltage module 604 in FIG. 2 further comprises a rectification diode 615 configured to convert the input AC line voltage into a half-wave DC voltage. In FIG. 2, the same numerals are used for the same components as in FIG. 1. The rectification diode 615 is connected to the resistive load 301 in the pulse amplitude control module 104 to build up the half-wave DC voltage to operate the pulse amplitude control module 104.

Figure 3:
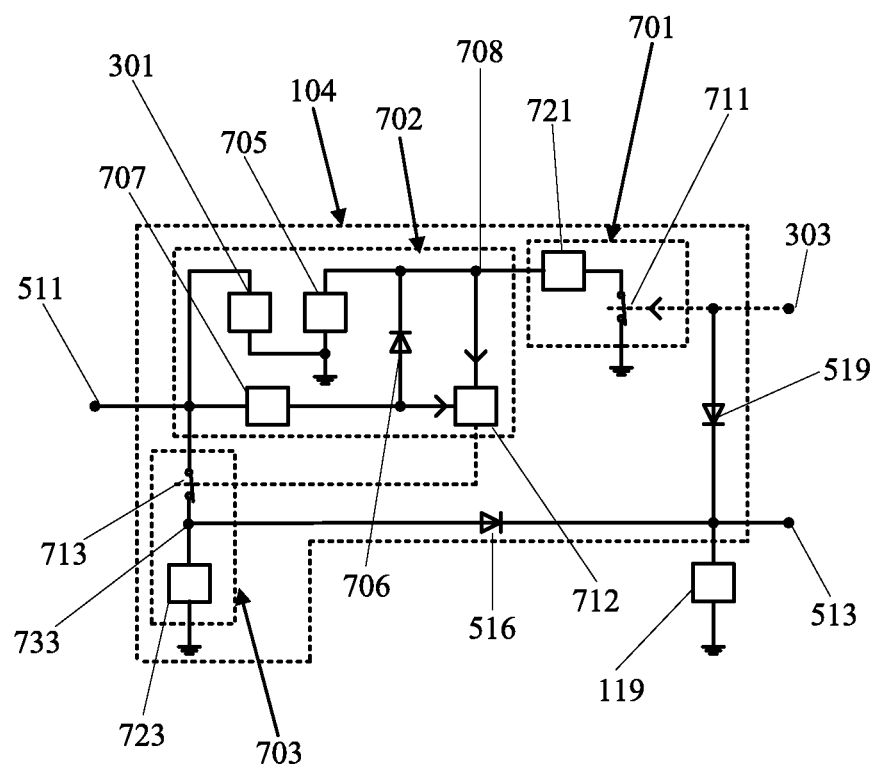
FIG. 3 is one embodiment of a pulse amplitude control module used in an LLT lamp according to the present disclosure.

FIG. 3 is one embodiment of the pulse amplitude control module used in an LLT lamp according to the present disclosure. The pulse amplitude control module 104 comprises a first control mechanism 701, a second control mechanism 702, a third control mechanism 703, a first diode 516, and a second diode 519. The first control mechanism 701 comprises a first switch 711 and a coupling resistor 721 and is coupled to a voltage feedback module 300 (in FIG. 4) via a port 303. When the electric shock does not occur, and when the driver 400 is operated, a feedback voltage from the voltage feedback module 300 turns on the first switch 711, which then disables the second control mechanism 702 by pulling down a voltage at a port 708. The second control mechanism 702 comprises a resistive load 301, one or more voltage-reduced resistors 707, a Zener diode voltage regulator 705, a second switch 712, and a feed-forward diode 706. The feed-forward diode 706 is coupled to the at least one electrical conductor 350 via the one or more voltage-reduced resistors 707. The resistive load 301 is connected to the input 511 further connected to the at least one electrical conductor 350 (in FIG. 1) and is configured to provide a current return path coupled to a common ground of the full-wave rectifier 603 to generate the half-wave DC voltage at the input 511 and to operate the second control mechanism 702. The Zener diode voltage regulator 705 receives the half-wave DC voltage via the one or more voltage-reduced resistors 707 and the feed-forward diode 706 and is configured to set up a reference voltage. The second switch 712 operates to create initial one or more pulses in each AC cycle in response to the half-wave DC voltage when the half-wave DC voltage via the one or more voltage-reduced resistors 707 is lower than the reference voltage. The initial one or more pulses in each AC cycle are used to control the third control mechanism 703. Because the half-wave DC voltage is affected when a person touches an exposed electrical conductor of the LLT lamp (i.e., the electric shock), the second control mechanism 702 generates two different initial one or more pulses in each AC cycle in response to the half-wave DC voltage, depending on whether the electric shock occurs or not. When an electric shock occurs, the second control mechanism 702 generates the initial one or more voltage pulses with the relatively low amplitude. When the at least one electrical conductor 250 or 350 in each lamp base is inserted into the respective lamp fixture socket 810 or 820 and receives the input AC line voltage without encountering an electric shock, the second control mechanism generates the initial one or more voltage pulses with the relatively high amplitude. Note that the first switch 711 and the second switch 712 are an electronic one which comprises a metal-oxide-semiconductor field-effect transistor (MOSFET), a transistor, or a combination thereof.

The third control mechanism 703 comprises a third switch 713 and a coupling device 723 connected to the second switch 713 at a port 733. The third switch 713, connected to the input 511 and the output 513 via the first diode 516, is controlled to receive the initial one or more voltage pulses and to create the one or more voltage pulses in response to the initial one or more pulses in each AC cycle and to build up the first DC voltage or the second DC voltage in the power sustaining device 119, respectively depending on whether the electric shock occurs or not. As mentioned earlier, when the electric shock occurs, the first DC voltage is built up in the power sustaining device 119 but not high enough to operate the PFC and control device 103 (in FIG. 4), thereby disabling the PFC and control device 103 and the driver 400 without electric shock current leaking out. On the contrary, when the electric shock does not occur, the second DC voltage is built up in the power sustaining device 119, which is high enough to operate the PFC and control device 103, thereby enabling the driver 400 so as to deliver electrical power to the one or more LED arrays 214. Note that the third switch 713 is an electronic one, which comprises an MOSFET, a transistor, or a combination thereof.

The first diode 516 and the second diode 519 are connected with their cathodes connected side-by-side with a cathode joint connected to the power sustaining device 119 and the output 513. The anode of the second diode 519 is coupled to the driver 400 via the port 303, whereas the anode of the first diode is connected to the third control mechanism 703. The power sustaining device 119 is so connected to receive the one or more voltage pulses from the third control mechanism 703 to build up the first DC voltage or the second DC voltage or partial switching power from the driver 400 to build up a third DC voltage, depending on whether the electric shock occurs or not. As mentioned above, when the electric shock occurs, the power sustaining device 119 builds up the first DC voltage, which is not high enough to operate the PFC and control device 103 with the driver 400 disabled. As long as the electric shock continues to exist, the third control mechanism continues to send the one or more pulses in each AC cycle to build up the first DC voltage in the power sustaining device 119, thereby continuing to disable the driver 400. However, if the electric shock does not occur, the power sustaining device 119 builds up the second DC voltage, which is high enough to operate the PFC and control device 103 with the driver 400 enabled. That is to say, when the input AC line voltage is applied without the electric shock, both the second control mechanism 702 and the third control mechanism 703 are immediately enabled while the PFC and control device 103 has not received power from the power sustaining device 119, and the driver 400 is disabled. In this case, the first diode 516 is forward-biased while the second diode 519 is reverse-biased, and a first electric current is conducted to flow from the third control mechanism 703 into the power sustaining device 119 via the first diode 516. As long as the electric shock continues, both the second control mechanism 702 and the third control mechanism 703 are continuously enabled with the first DC voltage on the power sustaining device 119 while the driver 400 is continuously disabled, no substantial electric shock current actually leaking out. When an electric shock hazard disappears, the third control mechanism 703 sends the one or more voltage pulses in response to the initial one or more voltage pulses to build up the second DC voltage on the power sustaining device 119 to enable the driver 400. Once the driver 400 is operated, the first control mechanism 701 is enabled to disable the second control mechanism 702 and the third control mechanism 703. In this case, the second diode 519 is forward-biased with a second electric current flowing from the driver 400 into the power sustaining device 119 to build up the third DC voltage via the second diode 519.

Figure 4:
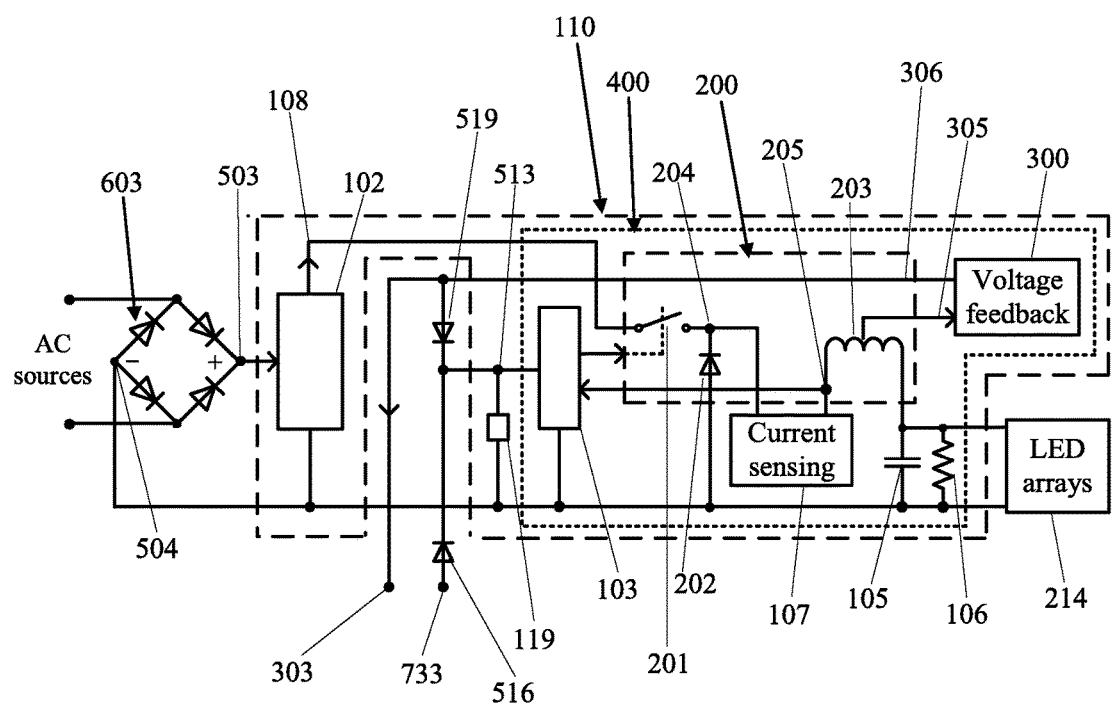
FIG. 4 is one embodiment of an LED driving circuit used in an LLT lamp according to the present disclosure.

FIG. 4 is one embodiment of an LED driving circuit used in an LLT lamp according to the present disclosure. In FIG. 4, the same numerals are used for the same components as in FIGS. 1-3. A full-wave rectifier 603 connecting to an AC source converts an input AC line voltage into a full-wave DC voltage. An LED driving circuit 110, connecting to the full-wave rectifier 603, comprises an input filter 102 used to filter the input voltage and to suppress EMI noise created in the LED driving circuit 110, a power sustaining device 119, and a driver 400. The driver 400 comprises a PFC and control device 103, a Buck converter 200 in communicating with the PFC and control device 103, an output capacitor 105 in parallel with a resistor 106 connected to the Buck converter 200 to build up an output voltage and to power the one or more LED arrays 214, a current sensing resistor 107, and a voltage feedback module 300 extracting partial energy from the output voltage to sustain the PFC and control device 103. The driver 400 has a high voltage input port 108 and a low voltage input port 513. The power sustaining device 119 is configured to provide a low DC voltage operating the PFC and control device 103. The full-wave rectifier 603 has four input/output ports, among which a high electric potential appears at a port 503 as V+, and a low electric potential appears at the a port 504 as V−, respectively connecting to the high side and the low side of the input filter 102 with the port 504 as a common ground. The Buck converter 200 comprises a switch 201 controlled by the PFC and control device 103, a flyback diode 202, and an inductor 203 with its current charging and discharging controlled by the switch 201. When the one or more voltage pulses from the pulse amplitude control module 104 are inputted from a port 733 via a first diode 516, a low DC voltage built up in the power sustaining device 119 applies to the PFC and control device 103. If the low DC voltage is high enough to operate the PFC and control device 103 and to sustain its operation, then the driver 400 can detect zero current in the inductor 203 within an AC cycle of an input voltage generating a zero current detection signal and controls the switch 201 on and off with a constant on-time and a varied off-time controlled by the zero current detection signal. The PFC and control device 103 controls the switch 201 on and off in a way that the inductor 203 is charged during on-time and discharged during off-time, and that a desired output voltage across the one or more LED arrays 214 is reached to light up the one or more LED arrays 214. The average inductor current is thus equal to the output current that flows into the LED array 214. When the switch 201 is on, the flyback diode 202 is reverse-biased, and an input current flows from the port 108 in the input filter 102, the switch 201, a first port 204 of the current sensing resistor 107, the current sensing resistor 107 itself, and a second port 205 of the current sensing resistor 107, into the inductor 203. When the current flowing into the inductor 203 increases, the voltage across the current sensing resistor 107 increases. The second port 205 of the current sensing resistor 107 is connected to the PFC and control device 103, which continuously receives signals and adjusts the off-time such that the output voltage and current to the one or more LED arrays 214 are regulated to meet the output requirements. The output capacitor 105 in parallel with the resistor 106 is connected to the inductor 203, receiving energy to build up the output voltage and to power the one or more LED arrays 214.

In FIG. 4, the inductor 203, configured as an autotransformer, has a center-tapped port connecting to the voltage feedback module 300 comprising a diode. The voltage feedback module 300 has two connection ports 305 and 306, with the first connection port 305 connecting to the center-tapped port of center-tapped inductor 203 and with the second connection port 306 connecting to the PFC and control device 103 via a second diode 519. The PFC and control device 103 is powered by the power sustaining device 119 with a voltage built up to supply an internal logic control circuit (not shown) in the PFC and control device 103. The second connection port 306 is also connected to the port 303 of the pulse amplitude control module 104. When the driver 400 is operated, a feedback voltage from the voltage feedback module 300 is used to disable the pulse amplitude control module 104. When the voltage decreases due to its increased internal operations and controls, and when the voltage at the center-tapped port of the inductor 203 is higher than the supplying voltage, the diode in the voltage feedback module 300 conducts to supply a current to the PFC and control device 103 and sustain its operations.

When the switch 201 is off, the flyback diode 202 is forward-biased, and the inductor 203 discharges with a loop current flowing from the one or more LED arrays 214, the flyback diode 202, the current sensing resistor 107, back to the inductor 203. The current sensing resistor 107 keeps track of the output current and feedbacks to the PFC and control device 103 to further control the switch 201 on and off. The closed loop operation in both on-time and off-time of the switch 201 ensures the output current to be accurately controlled within 4%.

Figure 5:
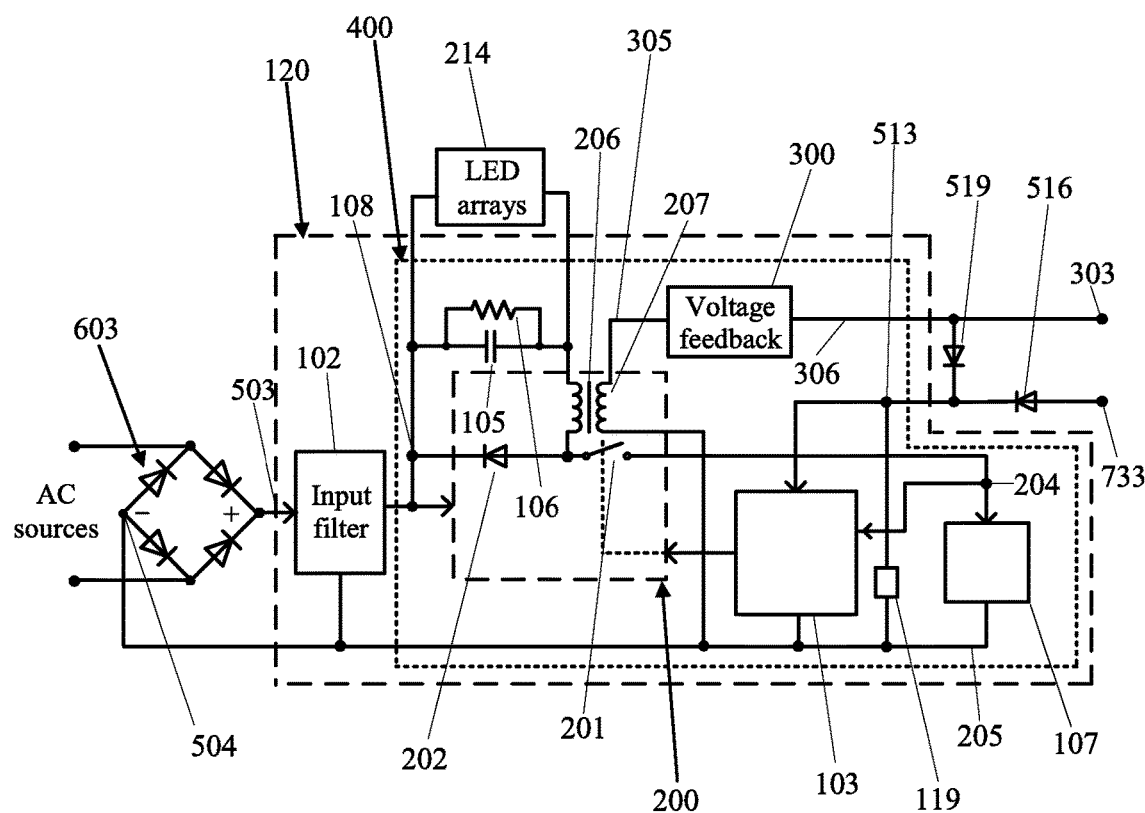
FIG. 5 is another embodiment of an LED driving circuit used in an LLT lamp according to the present disclosure.

FIG. 5 is another embodiment of an LED driving circuit used in an LLT lamp according to the present disclosure. An LED driving circuit 120 in FIG. 5 has all the components as the LED driving circuit 110 in FIG. 4, except that interconnections are different, and a transformer 206 in FIG. 5 replaces the center-tapped inductor 203 in FIG. 4. In FIG. 5, the same numerals are used for the same components as in FIG. 4. As in FIG. 4, the LED driving circuit 120, connecting to a full-wave rectifier 603, comprises an input filter 102, a driver 400, and a power sustaining device 119. The driver 400 comprises a PFC and control device 103, a Buck converter 200 in communicating with the PFC and control device 103, an output capacitor 105 in parallel with a resistor 106 connected to the Buck converter 200 to build up an output voltage and to power the one or more LED arrays 214, a current sensing resistor 107, and a voltage feedback module 300 extracting partial energy from the output voltage to sustain the PFC and control device 103. The driver 400 has a high voltage input port 108 and a low voltage input port 513. When the power is on, a high voltage input port 108 of the driver 400 receives an input current via the input filter 102, and the switch 201 controlled by the PFC and control device 103 is ready to be turned on to control the Buck converter 200. However, when the one or more voltage pulses from the pulse amplitude control module 104 are inputted from the port 733 via a first diode 516, a low DC voltage built up in the power sustaining device 119 applies to the PFC and control device 103. If the low DC voltage is not high enough to operate the PFC and control device 103 and to sustain its operation, then the driver 400 is not yet operable. If the low DC voltage is high enough to operate the PFC and control device 103 and to sustain its operation, then the switch 201 in the driver 400 is on, the flyback diode 202 is reverse-biased, and the input current goes from the resistor 106, a primary side of the transformer 206, the switch 201, and the current sensing resistor 107 to the common ground 504. When the input current goes into the primary side of the transformer 206, energy is stored in it. The PFC and control device 103 detects the input voltage level and control the switch 201 on and off in a way that a desired output voltage across the one or more LED arrays 214 is reached to light up the one or more LED arrays 214. When the switch 201 is off, the flyback diode 202 is forward-biased, and the primary side of the transformer 206 releases the energy stored, resulting in a loop current flowing from the flyback diode 202 and the one or more LED arrays 214, back to the primary side of the transformer 206, completing the energy transfer to the one or more LED arrays 214. When the switch 201 is on, the input current flows into the one or more LED arrays 214, the primary side of the transformer 206, the switch 201, and the current sensing resistor 107, creating a voltage drop across the current sensing resistor 107. The voltage appearing at the port 204 of the current sensing resistor 107 inputs to the PFC and control device 103 to control the off-time of the switch 201. The voltage feedback module 300 has two connection ports 305 and 306, with the first connection port 305 connecting to a high side of an auxiliary winding 207 in the transformer 206 and with the second connection port 306 connecting to the PFC and control device 103. The voltage feedback module 300 continuously monitors the output voltage by using the auxiliary winding 207 in the transformer 206. When the voltage at the high side of the auxiliary winding 207 is higher than a becoming lower operating voltage in the PFC and control device 103 due to increased internal operations, the diode (not shown) in the voltage feedback module 300 conducts to supply energy in time through the second connection port 306 and a second diode 519 to build up a DC voltage in the power sustaining device 119 and to support operating the PFC and control device 103. The second connection port 306 is also connected to the port 303 of the pulse amplitude control module 104. When the driver 400 is operated, a feedback voltage from the voltage feedback module 300 is used to disable the pulse amplitude control module 104.

In any case, when the DC voltage in the power sustaining device 119 is high enough to operate the PFC and control device 103 and to sustain its operation, then the driver 400 can detect zero current in the inductor 208 within an AC cycle of an input voltage generating a zero current detection signal and controls the switch 201 on and off with a constant on-time and a varied off-time controlled by the zero current detection signal such that the transformer 206 is charged during on-time and discharged during off-time, and that a desired output voltage V, across the one or more LED arrays 214 is reached to light up the one or more LED arrays 214. The average inductor current is thus equal to the output current that flows into the LED array 214. When the switch 201 is on, the flyback diode 202 is reverse-biased, and an input current flows from an output port 108 in the input filter 102, the switch 201, the first port 204 of the current sensing resistor 107, the current sensing resistor 107 itself, and the second port 205 of the current sensing resistor 107, into the transformer 206. When the current flowing into the transformer 206 increases, the voltage across the current sensing resistor 107 increases. The second port 205 of the current sensing resistor 107 connects with the PFC and control device 103, which continuously receives signals and adjusts the off-time such that the output voltage and current to the one or more LED arrays 214 are regulated to meet the output requirements. The output capacitor 105 in parallel with the resistor 106 connects to the transformer 206, receiving energy to build up an output voltage and to power the one or more LED arrays 214.

In FIG. 5, the voltage feedback module 300 has two connection ports 305 and 306, with the first connection port 305 connecting to the transformer 206 and with the second connection port 306 connecting to the PFC and control device 103. The PFC and control device 103 is powered by the power sustaining device 119 with a voltage built up to supply an internal logic control circuit (not shown) in the PFC and control device 103. When the voltage decreases due to its increased internal operations and controls, and when the voltage of the transformer 206 is higher than the supplying voltage, the diode in the voltage feedback module 300 conducts to supply a current to the PFC and control device 103 and sustain its operations. The function of the voltage feedback module 300 is essential to operate the LED driving circuit 120 and the one or more LED arrays 214 without flickering. When the switch 201 is off, the flyback diode 202 is forward-biased, and the inductor 208 discharges with a loop current flowing from the one or more LED arrays 214, the flyback diode 202, the current sensing resistor 107, back to the inductor 208. The current sensing resistor 107 keeps track of the output current and feedbacks to the PFC and control device 103 to further control the switch 201 on and off. Note that the switch 201 in FIG. 4 and FIG. 5 is an electronic one, which comprises an MOSFET, a transistor, or a combination thereof.

Figure 6:
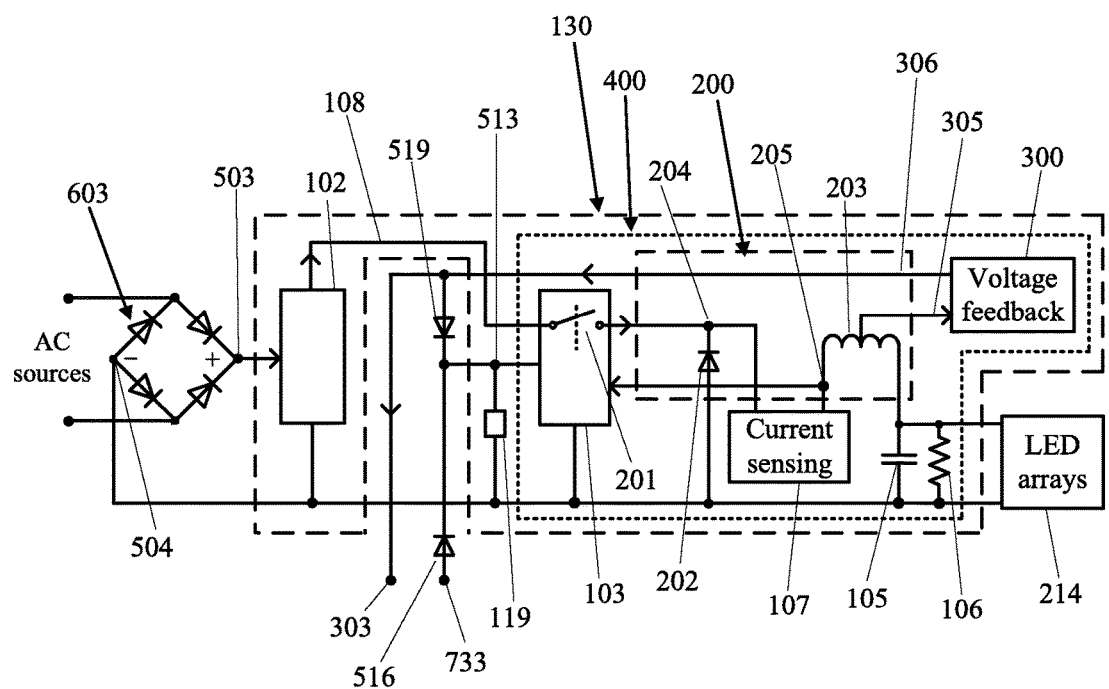
FIG. 6 is another embodiment of an LED driving circuit similar to FIG. 4 according to the present disclosure.

FIG. 6 is another embodiment of an LED driving circuit similar to FIG. 4 according to the present disclosure. An LED driving circuit 130 in FIG. 6 has all the components as the LED driving circuit 110 in FIG. 4, except that interconnections are different, and a built-in switch 201 in FIG. 6 replaces an external switch 201 in FIG. 5. In FIG. 6, the same numerals are used for the same components in FIG. 4. As in FIG. 4, the LED driving circuit 130, connecting to a full-wave rectifier 603, comprises an input filter 102, a driver 400, a power sustaining device 119, and a driver 400. The driver 400 comprises a PFC and control device 103, a Buck converter 200 in communicating with the PFC and control device 103, an output capacitor 105 in parallel with a resistor 106 connected to the Buck converter 200 to build up an output voltage and to power one or more LED arrays 214, a current sensing resistor 107, and a voltage feedback module 300 extracting partial energy from the output voltage to sustain the PFC and control device 103. The driver 400 has a high voltage input port 108 and a low voltage input port 513. When the power is on, the high voltage input port 108 of the driver 400 receives an input current via the input filter 102, and the built-in switch 201 controlled by the PFC and control device 103 is ready to be turned on to control the Buck converter 200. However, when the one or more voltage pulses from the pulse amplitude control module 104 are inputted from the port 733 via a first diode 516, a low DC voltage built up in the power sustaining device 119 applies to the PFC and control device 103. If the low DC voltage is not high enough to operate the PFC and control device 103 and to sustain its operation, then the driver 400 is not yet operable. If the low DC voltage is high enough to operate the PFC and control device 103 and to sustain its operation, then the built-in switch 201 in the driver 400 is on, the flyback diode 202 is reverse-biased, and the input current goes from the resistor 106, an inductor 203, the built-in switch 201, and the current sensing resistor 107 to the common ground 504, completing an AC cycle. When the input current goes into the inductor 203, energy is stored in it. The PFC and control device 103 detects the input voltage level and control the built-in switch 201 on and off in a way that a desired output voltage across the one or more LED arrays 214 is reached to light up the one or more LED arrays 214. When the built-in switch 201 is off, the flyback diode 202 is forward-biased, and the inductor 203 releases the energy stored, resulting in a loop current flowing from the flyback diode 202 and the one or more LED arrays 214, back to the inductor 203, completing the energy transfer to the one or more LED arrays 214. When the built-in switch 201 is on, the input current flows into the one or more LED arrays 214, the inductor 203, the built-in switch 201, and the current sensing resistor 107, creating a voltage drop across the current sensing resistor 107. The voltage appearing at the port 204 of the current sensing resistor 107 inputs to the PFC and control device 103 to control the off-time of the built-in switch 201. The voltage feedback module 300 has two connection ports 305 and 306, with the first connection port 305 connecting to the inductor 203 and with the second connection port 306 connecting to the PFC and control device 103. The voltage feedback module 300 continuously monitors the output voltage by using the inductor 203. When the voltage at the inductor 203 is higher than a becoming lower operating voltage in the PFC and control device 103 due to increased internal operations, the diode (not shown) in the voltage feedback module 300 conducts to supply energy in time through the second connection port 306 and a second diode 519 to build up a DC voltage in the power sustaining device 119 and to support operating the PFC and control device 103. Note that the built-in switch 201 in FIG. 6 is an electronic one, which comprises an MOSFET.

Figure 7:
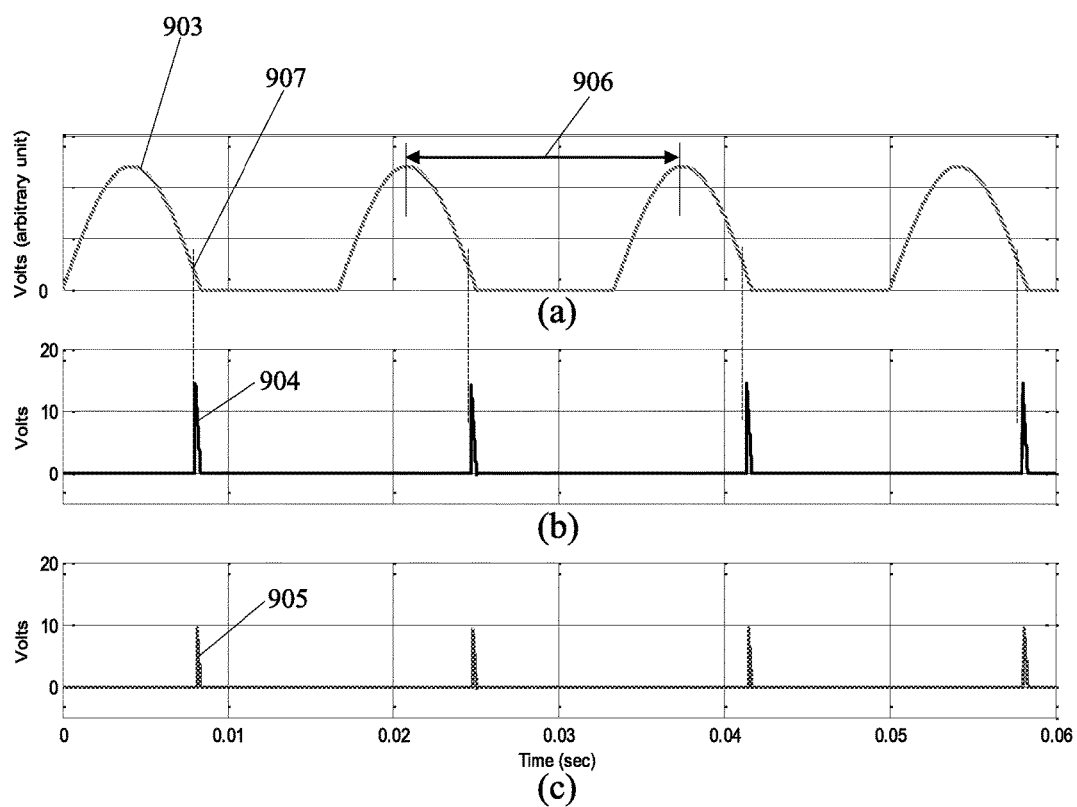
FIG. 7 is illustrations of one or more voltage pulses with amplitudes controlled by the pulse amplitude control module according to the present disclosure.

FIG. 7 is illustrations of one or more voltage pulses with amplitudes controlled by a pulse amplitude control module according to the present disclosure. FIG. 7 (*a*) illustrates the half-wave DC voltage 903 at the port 511 in FIG. 3. FIG. 7 (*b*) illustrates one or more voltage pulses with a relatively high amplitude 904. FIG. 7 (*c*) illustrates the one or more voltage pulses with a relatively low amplitude 905. The half-wave DC voltage 903, having a periodicity 906 of 1/60 seconds, is used by the second control mechanism 702 and the third control mechanism 703 in FIG. 3 to generate the one or more voltage pulses 904 or 905 in each AC cycle in response to the half-wave DC voltage 903 when the LLT lamp starts to receive power from the input AC line voltage and when the half-wave DC voltage 903 drops to a few tens of volts at a point 907 of the DC voltage 903 in each AC cycle for maximum sensitivity to a change of the half-wave DC voltage due to the electric shock with respect to a change of time. When the electric shock does not occur, the second control mechanism 702 and the third control mechanism 703 generate the one or more voltage pulses 904, whereas when the electric shock occurs, the second control mechanism 702 and the third control mechanism 703 generate the one or more voltage pulses 905 in each AC cycle. Although only one voltage pulse in each AC cycle is illustrated in FIG. 7, more voltage pulses or peaks in each AC cycle may appear.

Whereas preferred embodiments of the present disclosure have been shown and described, it will be realized that alterations, modifications, and improvements may be made thereto without departing from the scope of the following claims. Another kind of the electric shock prevention schemes in an LED-based lamp using various kinds of combinations to accomplish the same or different objectives could be easily adapted for use from the present disclosure. Accordingly, the foregoing descriptions and attached drawings are by way of example only, and are not intended to be limiting.

What is claimed is:

1. A linear light-emitting diode (LED) tube lamp, comprising:

a housing having two ends;

one or more LED arrays disposed between the two ends of the housing;

two lamp bases respectively connected to the two ends of the housing, each lamp base comprising at least one electrical conductor configured to insert into a respective lamp fixture socket;

a direct-current (DC) voltage module comprising at least one full-wave rectifier connected to an input alternate-current (AC) line voltage via the at least one electrical conductor in each lamp base, the DC voltage module configured to convert the input AC line voltage to a full-wave DC voltage and a half-wave DC voltage;

an LED driving circuit comprising a power factor correction (PFC) and control device, a power sustaining device, an electronic switch controlled by the PFC and control device, and a voltage feedback module, the LED driving circuit configured to receive the full-wave DC voltage, to generate an LED voltage and current, and to power up the one or more LED arrays; and a pulse amplitude control module comprising an input connected to the at least one electrical conductor of each lamp base in a way that the half-wave DC voltage appears at the input, the pulse amplitude control module configured to generate one or more voltage pulses when the half-wave DC voltage drops to a few tens of volts in each AC cycle and to control a DC voltage in the power sustaining device, wherein:

when an electric shock occurs, the pulse amplitude control module generates the one or more voltage pulses with a relatively low amplitude such that the DC voltage in the power sustaining device fails to reach an operating voltage of the PFC and control device, thereby disabling the PFC and control device and the LED driving circuit without an electric shock current leaking into the at least one electrical conductor of at least one of the two lamp bases that is exposed to the electric shock; and when the at least one electrical conductor of each lamp base is inserted into the respective lamp fixture socket and receives the input AC line voltage, the pulse amplitude control module generates the one or more voltage pulses with a relatively high amplitude such that the DC voltage in the power sustaining device reaches the operating voltage of the PFC and control device, thereby enabling the LED driving circuit to deliver electrical power to the one or more LED arrays.

2. The linear LED tube lamp of claim 1, wherein the LED driving circuit further comprises a transformer comprising a primary winding and an auxiliary winding, and wherein the auxiliary winding is connected to the voltage feedback module from which a feedback voltage can be extracted.

3. The linear LED tube lamp of claim 2, wherein the LED driving circuit further comprises an input filter, a high voltage input configured to receive a filtered DC voltage from the input filter, a current sensing resistor, a flyback diode, and an output capacitor connected to the primary winding of the transformer to build up an output voltage and to power the one or more LED arrays, wherein the primary winding of the transformer is charged and discharged through the electronic switch and the flyback diode, and wherein, responsive to detecting zero current in the primary winding of the transformer within an AC cycle of the input AC line voltage, the PFC and control device generates a zero current detection signal to turn the electronic switch on and off.

4. The linear LED tube lamp of claim 2, wherein the electronic switch comprises a built-in MOSFET integrated in the PFC and control device, wherein the LED driving circuit further comprises an input filter, a high voltage input configured to receive a filtered DC voltage from the input filter, a current sensing resistor, a flyback diode, and an output capacitor connected to the primary winding of the transformer to build up an output voltage and to power the one or more LED arrays, wherein the primary winding of the transformer is charged and discharged through the built-in MOSFET and the flyback diode, and wherein, responsive to detecting zero current inthe primary winding of the transformer within an AC cycle of the input AC line voltage, the PFC and control device generates a zero current detection signal to turn the built-in MOSFET on and off.

5. The linear LED tube lamp of claim 1, wherein the LED driving circuit further comprises an autotransformer connected to the voltage feedback module from which a feedback voltage can be extracted.

6. The linear LED tube lamp of claim 1, wherein the DC voltage module further comprises a rectification diode configured to generate the half-wave DC voltage and to operate the pulse amplitude control module.

7. The linear LED tube lamp of claim 1, wherein the electronic switch comprises a metal-oxide-semiconductor field-effect transistor (MOSFET), a transistor, or a combination thereof.

8. The linear LED tube lamp of claim 1, wherein the pulse amplitude module further comprises a resistive load configured to provide a current return path coupled to a common ground of the full-wave rectifier to generate the half-wave DC voltage and to operate the pulse amplitude control module.

9. The linear LED tube lamp of claim 5, wherein the LED driving circuit further comprises an input filter, a high voltage input configured to receive a filtered DC voltage from the input filter, a current sensing resistor, a flyback diode, and an output capacitor connected to the autotransformer to build up an output voltage and to power the one or more LED arrays, wherein the autotransformer is charged and discharged through the electronic switch and the flyback diode, and wherein, responsive to detecting zero current in the autotransformer within an AC cycle of the input AC line voltage, the PFC and control device generates a zero current detection signal to turn the electronic switch on and off.

10. The linear LED tube lamp of claim 1, wherein the pulse amplitude control module further comprises a first control mechanism, a second control mechanism, and a third control mechanism, respectively comprising a first switch, a second switch, and a third switch, wherein the first control mechanism is coupled to the voltage feedback module, and wherein when the electric shock does not occur, and when the LED driving circuit is operated, the first control mechanism operates to disable the second control mechanism and the third control mechanism.

11. The linear LED tube lamp of claim 10, wherein the first switch is configured to pull down a voltage in the second control mechanism to disable the second control mechanism.

12. The linear LED tube lamp of claim 10, wherein each of the first switch, the second switch, and the third switch comprises an MOSFET, a transistor, or a combination thereof.

13. The linear LED tube lamp of claim 10, wherein the second control mechanism further comprises one or more voltage-reduced devices, a feed-forward diode, and a Zener diode voltage regulator, the second control mechanism configured to receive the half-wave DC voltage via the one or more voltage-reduced devices and the feed-forward diode to set up a reference voltage and to create initial one or more pulses in each AC cycle in response to the half-wave DC voltage.

14. The linear LED tube lamp of claim 13, wherein the third switch is coupled to receive the half-wave DC voltage and configured to create the one or more voltage pulses in response to the initial one or more pulses in each AC cycle.

15. The linear LED tube lamp of claim 1, wherein the pulse amplitude control module further comprises a first diode and a second diode connected to the first diode with a cathode joint, wherein an anode of the second diode is coupled to the voltage feedback module, wherein an anode of the first diode is connected to the third control mechanism, and wherein the power sustaining device is coupled to the cathode joint to receive the one or more voltage pulses from the third control mechanism via the first diode or a feedback voltage from the voltage feedback module via the second diode.

16. The linear LED tube lamp of claim 15, wherein when the input AC line voltage is applied, both the second control mechanism and the third control mechanism are initially enabled while the LED driving circuit is disabled, wherein the first diode is forward-biased while the second diode is reverse-biased, and wherein a first electric current is conducted to flow from the third control mechanism into the power sustaining device via the first diode.

17. The linear LED tube lamp of claim 16, wherein when the electric shock occurs, both the second control mechanism and the third control mechanism are continuously enabled while the LED driving circuit is continuously disabled, thus allowing no electric shock current leaking into the at least one electrical conductor of the at least one of the two lamp bases that is exposed to the electric shock.

18. The linear LED tube lamp of claim 17, wherein when the electric shock disappears, the pulse amplitude control module generates one or more voltage pulses to control the DC voltage in the power sustaining device to enable the LED driving circuit, wherein once the LED driving circuit is operated, the first control mechanism is enabled to disable both the second control mechanism and the third control mechanism, and wherein the second diode is forward-biased with a second electric current flowing from the voltage feedback module into the power sustaining device via the second diode.

* * * * *